United States Patent
Sun et al.

(10) Patent No.: US 8,458,375 B2
(45) Date of Patent: Jun. 4, 2013

(54) PORTABLE ELECTRONIC DEVICE HAVING MULTIFUNCTIONAL AUDIO PORT

(75) Inventors: Zheng-Heng Sun, New Taipei (TW); Kang Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 161 days.

(21) Appl. No.: 13/207,341

(22) Filed: Aug. 10, 2011

(65) Prior Publication Data

US 2012/0290742 A1  Nov. 15, 2012

(30) Foreign Application Priority Data

May 9, 2011  (CN) .......................... 2011 1 0118060

(51) Int. Cl.
*G06F 3/00* (2006.01)

(52) U.S. Cl.
USPC ............................................. 710/11; 710/16

(58) Field of Classification Search
USPC .................................................... 710/11, 16
See application file for complete search history.

(56) References Cited

U.S. PATENT DOCUMENTS

| | | | |
|---|---|---|---|
| 8,396,509 B2 * | 3/2013 | Chen et al. | 455/557 |
| 2008/0270647 A1 * | 10/2008 | Shih et al. | 710/63 |
| 2012/0265911 A1 * | 10/2012 | Connolly | 710/300 |

* cited by examiner

*Primary Examiner* — Ernest Unelus
(74) *Attorney, Agent, or Firm* — Altis Law Group, Inc.

(57) ABSTRACT

A portable electronic device includes an audio port, a universal serial bus (USB) circuit, an audio circuit, a detecting unit, a switch, and a microcontroller. The detecting unit is connected to the audio port. The detecting unit generates a detecting signal in response to detection of either the earphone/microphone or the USB apparatus being connected to the audio port. The microcontroller is connected to the detecting unit and the switch. The microcontroller selects the audio circuit or the USB circuit to the audio port by the switch according to the detecting signal.

11 Claims, 3 Drawing Sheets

PORTABLE ELECTRONIC DEVICE HAVING MULTIFUNCTIONAL AUDIO PORT

BACKGROUND

1. Technical Field

The disclosure generally relates to portable electronic devices, and particularly to a portable electronic device having a multifunctional audio port which can connect to both an earphone/microphone and a universal serial bus (USB) apparatus.

2. Description of Related Art

Portable electronic devices, such as personal computers, commonly include a plurality of connection ports such as an earphone/microphone jack, and USB ports for connecting to other peripheral components. However, many portable electronic devices do not provide a sufficient number of connection ports in order to use multiple peripheral components. In addition, each connection port present may be designed only for a certain kind of peripheral component. For example, the earphone jack can only connect to an earphone and cannot connect to a USB mouse. Therefore, there is a lack of flexibility in the portable electronic device.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the disclosure.

DETAILED DESCRIPTION

Figure 2:
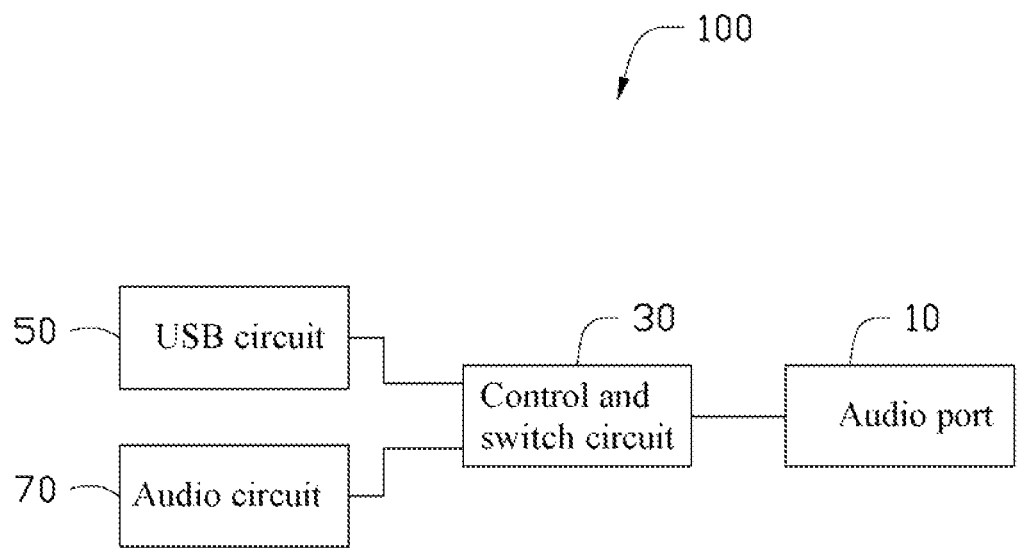
FIG. 2 is a block diagram of the portable electronic device of FIG. 1.

FIG. is a schematic view of a portable electronic device 100 with a converter 80, according to an exemplary embodiment. Also referring to FIG. 2, the portable electronic device 100 includes an audio port 10, a control and switch circuit 30, a USB circuit 50 and an audio circuit 70.

Figure 1:
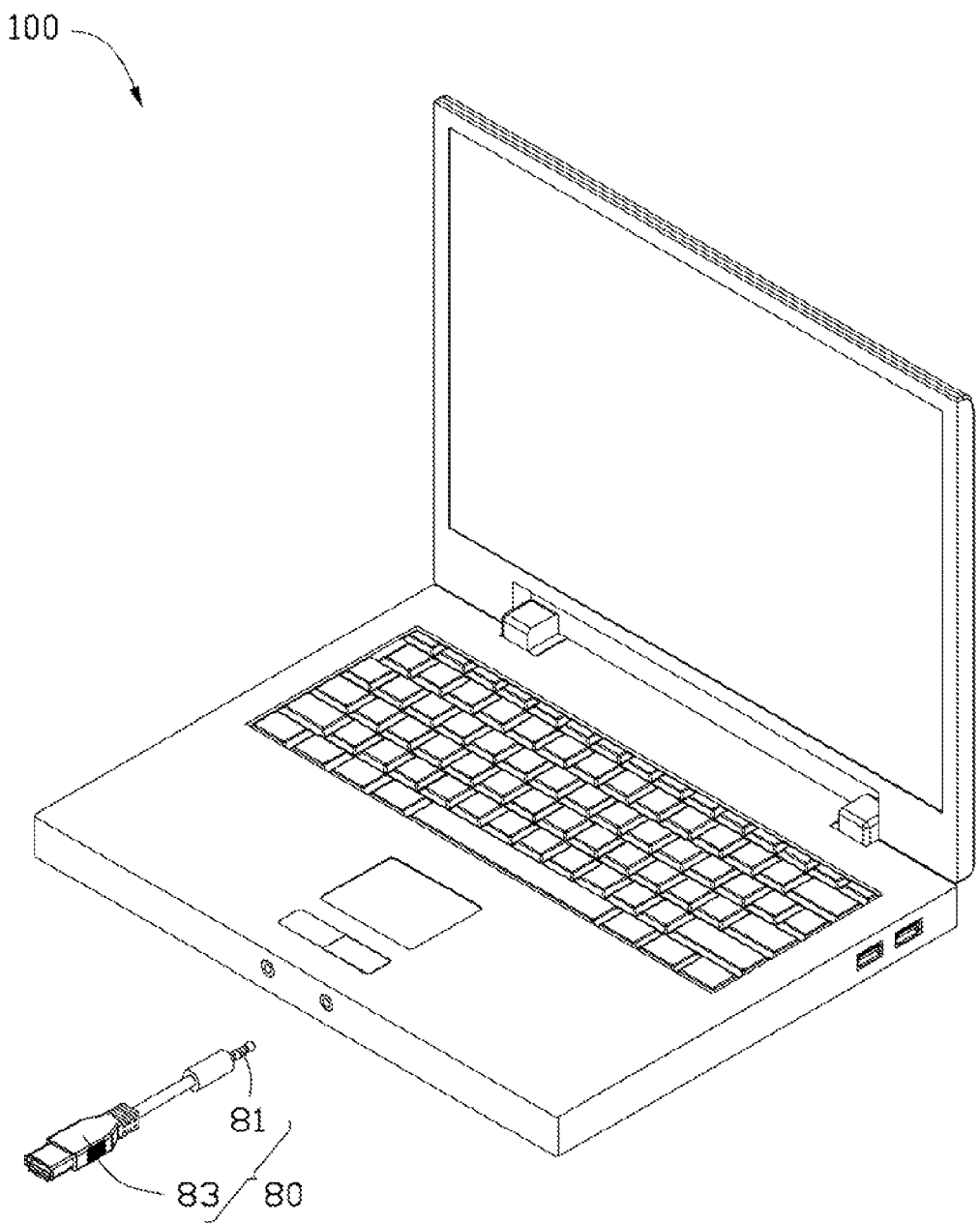
FIG. 1 is a schematic view of a portable electronic device with a converter, according to an exemplary embodiment.
Figure 3:
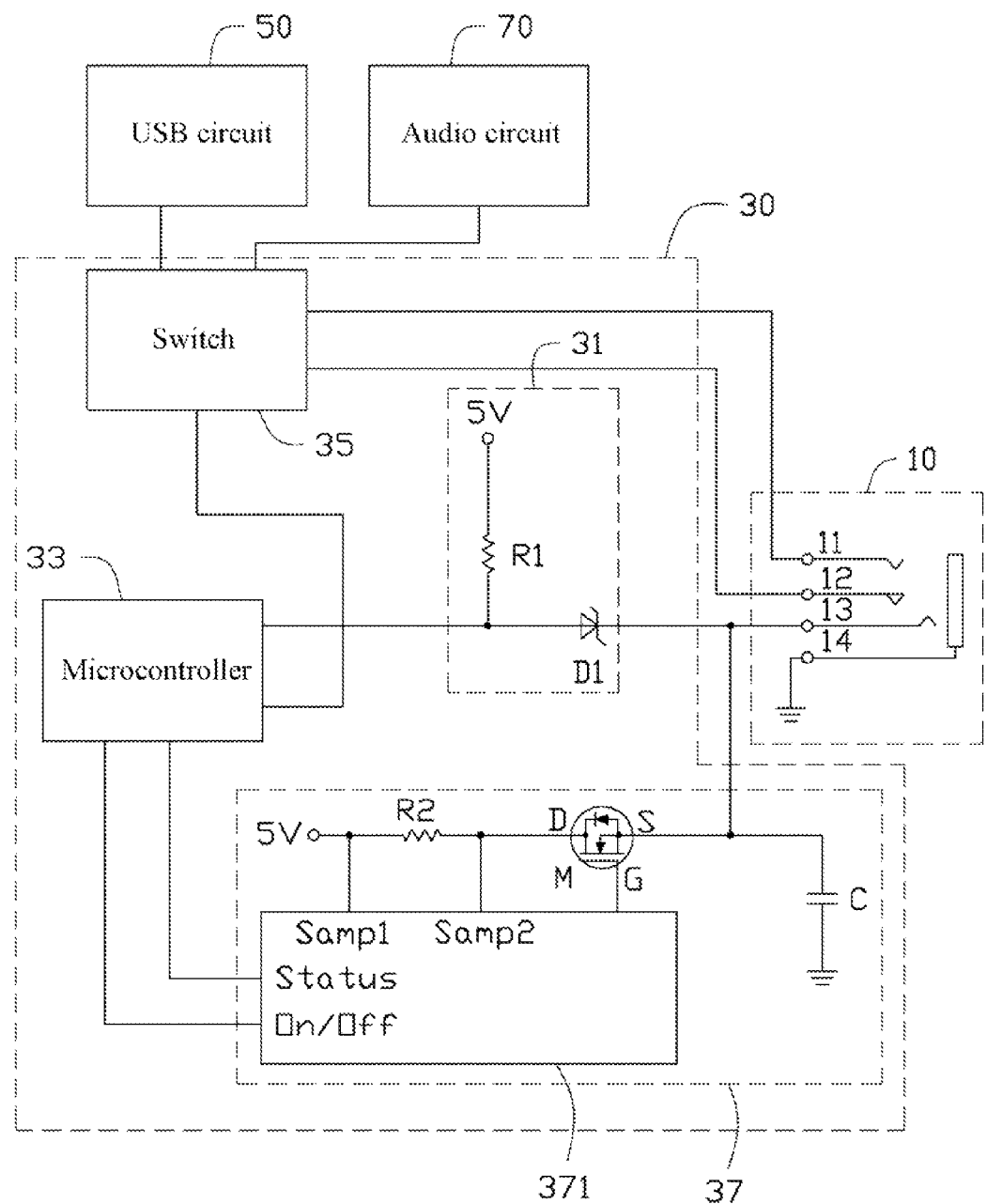
FIG. 3 is a partial circuit diagram of the portable electronic device of FIG. 1.

Also referring to FIG. 3, the audio port 10 is a standard earphone/microphone jack used for directly connecting to an earphone/microphone or connecting to a USB peripheral such as a USB mouse, or a USB keyboard by the converter 80 (shown in FIG. 1). The audio port 10 includes a first contact 11, a second contact 12, a third contact 13, and a fourth contact 14. The fourth contact 14 is grounded.

A typical earphone/microphone plug includes a left channel contact, a right channel contact, and a ground contact. When the earphone plug is inserted into the audio port 10, the first contact 11 and the second contact 12 are respectively electrically connected to the left channel contact and the right channel contact. The third contact 13 and the fourth contact 14 are connected to the ground contact and grounded.

The converter 80 includes a converter plug 81 and a USB connector 83 connected to the plug 81. The converter plug 81 includes a first data contact, a second data contact, a ground contact, and a power supply contact. When the converter plug 81 is inserted into the audio port 10, the first contact 11, the second contact 12, the third contact 13 and the fourth contact 14 are respectively connected to the first data contact, the second data contact, the power supply contact and the ground contact. Thus, the USB connector 83 is electrically connected to the audio port 10 through the converter plug 81.

The control and switch circuit 30 includes a detecting unit 31, a microcontroller 33, a switch 35, and a power management unit 37.

The detecting unit 31 includes a diode D1 and a resistor R1. A cathode of the diode D1 is connected to the third contact 13. A node of the diode D1 is connected to a 5V power supply by the resistor R1 and also connected to the microcontroller 33. When the earphone/microphone plug is inserted in the audio port 10, the third contact 13 is grounded, thus the diode D1 is turned on, and a low voltage detecting signal (such as 0V) is sent to the microcontroller 33. When the converter plug 81 is inserted in the audio port 10, the diode D1 is turned off and a high voltage detecting signal (such as 5V) is sent to the microcontroller 33. Therefore, the microcontroller 33 can determine whether it is the earphone/microphone or the USB apparatus which is connected to the audio port 10, according to the detecting signal available from the detecting unit 31.

The microcontroller 33 is also connected to the switch 35. One end of the switch 35 is connected to the first contact 11 and the second contact 12. Another end of the switch 35 is selectably and exclusively connected either to the USB circuit 50 or to the audio circuit 70. The microcontroller 33 connects either the USB circuit 50 or the audio circuit 70 to the audio port 10 according to the detecting signal. When the high voltage detecting signal is received from the detecting unit 31, the microcontroller 33 connects the USB circuit 50 to the audio port 10. When the low voltage detecting signal is received from the detecting signal, the microcontroller 33 connects the audio circuit 70 to the audio port 10.

The power management unit 37 is connected to the microcontroller 33 and the audio port 10. The power management unit 37 includes a transistor M, a sampling resistor R2, and a hot swap controller 371. In this embodiment, the transistor M is a metal oxide semiconductor field effect transistor (MOSFET). A source of the transistor M is connected to the third contact 13 and also grounded by a capacitor C. A drain of the transistor M is connected to the power supply 5V by the sampling resistor R2. A gate of the transistor M is connected to the hot swap controller 371.

The hot swap controller 371 includes two sampling contacts, Samp1, Samp2, a status contact, Status, and a control contact, On/Off. The two sampling contacts Samp1, Samp2 are connected to two ends of the sampling resistor R2. The status contact Status and the control contact On/Off are connected to the microcontroller 33. The hot swap controller 371 detects a voltage of the sampling resistor R2 and compares the detected voltage with a reference voltage. When the detected voltage is lower than the reference voltage, the hot swap controller 341 controls the transistor M to turn on and the power supply 5V provides a voltage to the third contact 13. When the detected voltage is higher than the reference voltage, that is to say that the current flowing through the sampling resistor R2 is too high, the hot swap controller 341 controls the transistor M to turn off and also sends a warning signal to the microcontroller 33 to turn off the hot swap controller 371. Thus, the audio port 10 and the power management unit 37 can be protected against high current damage.

The USB circuit 50 and the audio circuit 70 are conventional circuits in the portable electronic device 100, for permitting a USB data exchange function and for an audio input/output function respectively.

The dual nature of the audio port 10 with the converter 80 allows much more flexibility, any USB apparatus can be connected to the portable electronic device 100 through a single audio port 10, and so the total number of the connecting ports of the portable electronic device 100 can be reduced.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A portable electronic device, comprising:
   an audio port;
   a universal serial bus (USB) circuit;
   an audio circuit
   a detecting unit connected to the audio port, and generating a detecting signal in response to detection of either an earphone/microphone or a USB apparatus being connected to the audio port;
   a switch selectively connecting the audio circuit or the USB circuit to the audio port according to the detecting signal;
   a microcontroller connected to the detecting unit and the switch, the microcontroller selecting the audio circuit or the USB circuit to connect to the audio port by the switch according to the detecting signal;
   wherein the audio port includes a first contact, a second contact, a third contact, and a fourth contact;
   a power management unit connected to the microcontroller and the audio port, wherein the power management unit includes a transistor, a sampling resistor, and a hot swap controller; a source of the transistor is connected to the third contact and also grounded by a capacitor, a drain of the transistor is connected to a power supply by the sampling resistor, a grain of the transistor is connected to the hot swap controller, the hot swap controller detects a voltage of the sampling resistor and controls the transistor to turn on/off according the detected voltage; and
   wherein the hot swap controller compares the detected voltage with a reference voltage, when the detected voltage is lower than the reference voltage, the hot swap controller controls the transistor to turn on; when the detected voltage is higher than the reference voltage, the hot swap controller controls the transistor to turn off.

2. The portable electronic device of claim 1, wherein in response to the earphone/microphone plug is connected to the audio port, the first contact and the second contact are respectively electrically connected to a left channel contact, and a right channel contact of the earphone/microphone plug, and the third contact and the fourth contact are grounded.

3. The portable electronic device of claim 1, wherein in response to the USB apparatus is connected to the audio port by a converter, the first contact, the second contact, the third contact and the fourth contact are respectively connected to a first data contact, a second data contact, a power supply contact and a ground contact of a converter plug.

4. The portable electronic device of claim 1, wherein the detecting unit includes a diode and a resistor, a cathode of the diode is connected to the third contact; a node of the diode is connected to a power supply by the resistor and also connected to the microcontroller.

5. The portable electronic device of claim 4, wherein in response to the earphone/microphone plug is connected to the audio port, the diode is turned on, the detecting unit sends a low voltage detecting signal to the microcontroller; in response to the USB apparatus is connected to the audio port by a converter, the diode is turned off, the detecting unit sends a high voltage detecting signal to the microcontroller.

6. The portable electronic device of claim 5, wherein when the high voltage detecting signal is received from the detecting unit, the microcontroller selects the USB circuit to connect to the audio port; when the low voltage detecting signal is received from the detecting signal, the microcontroller selects the audio circuit to connect to the audio port.

7. The portable electronic device of claim 1, wherein the hot swap controller is also connected to the microcontroller, when the detected voltage is higher than the reference voltage, the hot swap controller also sends an alarm signal to the microcontroller to notify the microcontroller to turn off the hot swap controller.

8. A portable electronic device, comprising:
   an audio port;
   a universal serial bus (USB) circuit;
   an audio circuit
   a detecting unit connected to the audio port;
   a switch selectively connecting the audio circuit or the USB circuit to the audio port;
   a microcontroller connected to the detecting unit and the switch; wherein when an earphone/microphone plug is inserted into the audio port, the detecting unit sends a low voltage detecting signal to the microcontroller, the microcontroller selects the audio circuit to connect to the audio port; when a USB apparatus is connected to the audio port, the detecting unit sends a high voltage detecting signal to the microcontroller, the microcontroller selects the USB circuit to connect to the audio port by the switch;
   wherein the audio port includes a first contact, a second contact, a third contact, and a fourth contact;
   a power management unit connected to the microcontroller and the audio port, wherein the power management unit includes a transistor, a sampling resistor, and a hot swap controller; a source of the transistor is connected to the third contact and also grounded by a capacitor, a drain of the transistor is connected to a power supply by the sampling resistor, a grain of the transistor is connected to the hot swap controller, the hot swap controller detects a voltage of the sampling resistor and controls the transistor to turn on/off according the detected voltage; and
   wherein the hot swap controller compares the detected voltage with a reference voltage, when the detected voltage is lower than the reference voltage, the hot swap controller controls the transistor to turn on; when the detected voltage is higher than the reference voltage, the hot swap controller controls the transistor to turn off.

9. The portable electronic device of claim 8, wherein in response to the earphone/microphone plug is inserted into the audio port, the first contact and the second contact are respectively electrically connected to a left channel contact, and a right channel contact of the earphone/microphone plug, and the third contact and the fourth contact are grounded.

10. The portable electronic device of claim 8, wherein in response to the USB apparatus is connected to the audio port by a converter, the first contact, the second contact, the third contact and the fourth contact are respectively connected to a first data contact, a second data contact, a power supply contact, and a ground contact of a converter plug.

11. The portable electronic device of claim 8, wherein the detecting unit includes a diode and a resistor, a cathode of the diode is connected to the third contact; a node of the diode is connected to a power supply by the resistor and also connected to the microcontroller.

* * * * *